United States Patent [19]

Baird, Jr. et al.

[11] Patent Number: 5,221,465

[45] Date of Patent: * Jun. 22, 1993

[54] HIGH ACTIVITY, HIGH YIELD TIN MODIFIED PLATINUM-IRIDIUM CATALYSTS, AND REFORMING PROCESS UTILIZING SUCH CATALYSTS

[75] Inventors: William C. Baird, Jr.; George A. Swan, III; Joseph P. Boyle, all of Baton Rouge, La.

[73] Assignee: Exxon Research and Engineering Company, Florham Park, N.J.

[*] Notice: The portion of the term of this patent subsequent to Apr. 20, 2009 has been disclaimed.

[21] Appl. No.: 814,659

[22] Filed: Dec. 30, 1991

Related U.S. Application Data

[62] Division of Ser. No. 627,528, Dec. 14, 1990, Pat. No. 5,106,809.

[51] Int. Cl.$^5$ .................. C10G 35/085; C10G 35/06; C10G 45/52
[52] U.S. Cl. .................... 208/139; 208/138; 502/223
[58] Field of Search ............... 208/138, 139; 502/223, 502/227

[56] References Cited

U.S. PATENT DOCUMENTS

| | | | |
|---|---|---|---|
| 3,718,578 | 2/1973 | Buss et al. | 208/139 |
| 4,588,495 | 5/1986 | Franck et al. | 208/65 |
| 4,677,094 | 6/1987 | Moser et al. | 502/227 |
| 4,714,538 | 12/1987 | Moser et al. | 208/139 |
| 4,714,539 | 12/1987 | Moser et al. | 208/139 |
| 4,714,540 | 12/1987 | Moser et al. | 208/139 |
| 4,737,262 | 4/1988 | Franck et al. | 208/65 |
| 4,737,483 | 4/1988 | Moser et al. | 502/227 |

*Primary Examiner*—Helane Myers
*Attorney, Agent, or Firm*—Henry E. Naylor

[57] ABSTRACT

Tin modified platinum-iridium catalysts provide high yields of $C_5+$ liquid reformate in catalytic reforming, concurrent with high activity. In particular, the tin modified platinum-iridium catalysts are of unusually high selectivity, as contrasted with known iridium promoted platinum catalysts. The high selectivity is manifested in reforming a naphtha feed in a reactor charged to capacity with the catalyst, but particularly when used in the dehydrocyclization zone, or tail reactor of a series of reactors, while the lead reactors of the series contain a non tin-containing platinum catalyst, especially a platinum-iridium, or a platinum-rhenium catalyst. The tin modified platinum-iridium catalysts are also highly active, with only moderate loss in the high activity for which iridium stabilized platinum catalysts are known.

20 Claims, No Drawings

HIGH ACTIVITY, HIGH YIELD TIN MODIFIED PLATINUM-IRIDIUM CATALYSTS, AND REFORMING PROCESS UTILIZING SUCH CATALYSTS

CROSS REFERENCE TO RELATED APPLICATIONS

This application is a Rule 1.60 Division of U.S. Ser. No. 627,528 Filed Dec. 14, 1990 now U.S. Pat. No. 5,106,809.

FIELD OF THE INVENTION

This invention relates to the art of catalytic reforming, and catalysts for use in such process. In particular, it relates to a high activity tin modified platinum-iridium catalyst which is per se useful in conducting catalytic reforming, but particularly useful in the tail reactor of a staged reactor system in producing high octane gasoline from naphtha with improved $C_5+$ liquid yields.

BACKGROUND

In catalytic reforming, a process for improving the octane quality of naphthas or straight run gasolines, a multi-functional catalyst is employed which contains a metal hydrogenation-dehydrogenation (hydrogen transfer) component, or components, composited with a porous, inorganic oxide support, notably alumina. Noble metal catalysts, notably of the platinum type, are currently employed, reforming being defined as the total effect of the molecular changes, or hydrocarbon reactions, produced by dehydrogenation of cyclohexanes and dehydroisomerization of alkylcyclopentanes to yield aromatics; dehydrogenation of paraffins to yield olefins; dehydrocyclization of paraffins and olefins to yield aromatics; isomerization of n-paraffins; isomerization of alkylcycloparaffins to yield cyclohexanes; isomerization of substituted aromatics; and hydrocracking of paraffins which produces gas, and inevitably coke, the latter being deposited on the catalyst.

Platinum is widely commercially used in the production of reforming catalysts, and platinum-on-alumina catalysts have been commercially employed in refineries for the last few decades. In the last several years, additional metallic components have been added to platinum as promoters to further improve the activity or selectivity, or both, of the basic platinum catalyst, e.g., iridium, rhenium, tin, and the like. Some of the polymetallic catalysts possess superior activity, or selectivity, or both, as contrasted with other catalysts. Platinum-rhenium catalysts by way of example possess admirable selectivity as contrasted with platinum catalysts, selectivity being defined as the ability of the catalyst to produce high yields of $C_5+$ liquid products with concurrent low production of normally gaseous hydrocarbons, i.e., methane and other gaseous hydrocarbons, and coke. Iridium-promoted catalysts, e.g., platinum-iridium, and platinum-iridium-tin (U.S. Pat. No. 4,436,612) catalysts, on the other hand, are known for their high activity, as contrasted e.g., with platinum and platinum-rhenium catalysts, activity being defined as the relative ability of a catalyst to convert a given volume of naphtha per volume of catalyst to high octane reformate.

In a reforming operation, one or a series of reactors, or a series of reaction zones, are employed. Typically, a series of reactors is employed, e.g., three or four reactors, these constituting the heart of the reforming unit. Each reforming reactor is generally provided with a fixed bed, or beds, of the catalyst which receive downflow feed, and each is provided with a pre-heater or interstage heater, because the reactions which take place are endothermic. A naphtha feed, with hydrogen, or recycle hydrogen gas, is passed through a preheat furnace and reactor and then in sequence through subsequent interstage heaters and reactors of the series. The product from the last reactor is separated into a liquid fraction, and a vaporous effluent. The former is recovered as a $C_5+$ liquid product. The latter is a gas rich in hydrogen, and usually contains small amounts of normally gaseous hydrocarbons, from which hydrogen is separated and recycled to the process to minimize coke production.

The sum-total of the reforming reactions, supra, occurs as a continuum between the first and last reactor of the series, i.e., as the feed enters and passes over the first fixed catalyst bed of the first reactor and exits from the last fixed catalyst bed of the last reactor of the series. The reactions which predominate between the several reactors differ dependent principally upon the nature of the feed, and the temperature employed within the individual reactors. In the initial reaction zone, or first reactor, which is maintained at a relatively low temperature, it is believed that the primary reaction involves the dehydrogenation of naphthenes to produce aromatics. The isomerization of naphthenes, notably $C_5$ and $C_6$ naphthenes, also occurs to a considerable extent. Most of the other reforming reactions also occur, but only to a lesser, or smaller extent. There is relatively little hydrocracking, and very little olefin or paraffin dehydrocyclization occurring in the first reactor. Within the intermediate reactor zone(s), or reactor(s), the temperature is maintained somewhat higher than in the first, or lead reactor of the series, and it is believed that the primary reactions in the intermediate reactor, or reactors, involve the isomerization of naphthenes and paraffins. Where, e.g., there are two reactors disposed between the first and last reactor of the series, it is believed that the principal reaction involves the isomerization of naphthenes, normal paraffins and isoparaffins. Some dehydrogenation of naphthenes may, and usually does occur, at least within the first of the intermediate reactors. There is usually some hydrocracking, at least more than in the lead reactor of the series, and there is more olefin and paraffin dehydrocyclization. The third reactor of the series, or second intermediate reactor, is generally operated at a somewhat higher temperature than the second reactor of the series. It is believed that the naphthene and paraffin isomerization reactions continue as the primary reaction in this reactor, but there is very little naphthene dehydrogenation. There is a further increase in paraffin dehydrocyclization, and more hydrocracking. In the final reaction zone, or final reactor, which is operated at the highest temperature of the series, it is believed that paraffin dehydrocyclization, particularly the dehydrocyclization of the short chain, notably $C_6$ and $C_7$ paraffins, is the primary reaction. The isomerization reactions continue, and there is more hydrocracking in this reactor than in any one of the other reactors of the series.

The activity of the catalyst gradually declines due to the build-up of coke. Coke formation is believed to result from the deposition of coke precursors such as anthracene, coronene, ovalene, and other condensed ring aromatic molecules on the catalyst, these polymerizing to form coke. During operation, the temperature of the the process is gradually raised to compensate for the activity loss caused by the coke deposition. Eventually, however, economics dictate the necessity of reactivating the catalyst. Consequently, in all processes of this type the catalyst must necessarily be periodically regenerated by burning of the coke at controlled conditions.

Improvements have been made in such processes, and catalysts, to reduce capital investment or improve $C_5+$ liquid yields while improving the octane quality of naphthas and straight run gasolines. New catalysts have been developed, old catalysts have been modified, and process conditions have been altered in attempts to optimize the catalytic contribution of each charge of catalyst relative to a selected performance objective. Nonetheless, while any good commercial reforming catalyst must possess good activity, activity maintenance and selectivity to some degree, no catalyst can possess even one, muchless all of these properties to the ultimate degree. Thus, one catalyst may possess relatively high activity, and relatively low selectivity and vice versa. Another may possess good selectivity, but its selectivity may be relatively low as regards another catalyst. Iridium catalysts, as a class are distinctive as regards their high activity and acceptable selectivity. Nonetheless, while catalysts with high activity are very desirable, there still remains a need, and indeed a high demand, for increased selectivity; and even relatively small increases in $C_5+$ liquid yield can represent large credits in commercial reforming operations.

OBJECTS

It is, accordingly, a basic objective of this invention to satisfy this need, and others.

In particular, it is an objective to provide a novel, highly active supported platinum catalyst, promoted with iridium; and additionally, small, critical amounts of tin sufficient to provide a tin modified platinum-iridium catalyst which, in producing high octane gasoline from naphtha, can produce greater yields of $C_5+$ reformate than catalysts otherwise similar except that they do not contain any tin, or contain tin in concentration outside the specified concentrations.

A further object is to provide a novel reforming process wherein the tin modified platinum-iridium catalyst of this invention is employed in the dehydrocyclization zone, or tail reactor of a series of reactors, while a different non-tin modified platinum, or polymetallic platinum catalyst is employed in the lead reactors of the series, to produce $C_5+$ reformate in high yields.

THE INVENTION

These objects and others are achieved in accordance with the present invention, embodying (i) a novel catalyst composition comprised of from about 0.1 percent to about 1.0 percent platinum, preferably from about 0.2 to about 0.7 percent platinum, from about 0.1 percent to about 1.0 percent iridium, preferably from about 0.2 to about 0.7 percent iridium, and from about 0.02 percent to about 0.4 percent tin, preferably from about 0.05 to about 0.3 percent tin, based on the total weight of the catalyst (dry basis), uniformly dispersed throughout a particulate solid support. Suitably, the weight ratio of the (platinum+iridium):tin will range from about 2:1 to about 25:1, preferably from about 5:1 to about 15:1, based on the total weight of platinum, iridium and tin in the catalyst composition. Suitably, the catalyst also contains halogen, preferably chlorine, in concentration ranging from about 0.1 percent to about 3 percent, preferably from about 0.8 to about 1.5 percent, based on the total weight of the catalyst. Preferably also, the catalyst is sulfided, e.g., by contact with a hydrogen sulfide-containing gas, and contains from about 0.01 percent to about 0.2 percent, more preferably from about 0.05 percent to about 0.15 percent sulfur, based on the total weight of the catalyst. The metal components, in the amounts stated, are uniformly dispersed throughout an inorganic oxide support, preferably an alumina support and more preferably a gamma alumina support, and (ii) a novel process for improving the octane quality of a naphtha in a reforming unit comprised of a plurality of serially connected reactors inclusive of one or more lead reactors and tail reactor, the lead reactors of which are provided with a platinum catalyst, preferably a rhenium-promoted or iridium-promoted platinum catalyst, and the tail reactor with a catalyst as described in (i), supra. A process of this type, it has been found, results in the suppression of excessive dealkylation reactions with simultaneous increase in dehydrocyclization reactions to increase $C_5+$ liquid yields, with only a modest activity debit vis-a-vis the use of a catalyst in the tail reactor which is otherwise similar but does not contain the tin, or contains tin in greater or lesser amounts than that prescribed for the tail reactor catalyst of this invention. In addition to the increased $C_5+$ liquid yields, temperature runaway rate during process upsets is tempered, and reduced; the amount of benzene produced in the reformate at similar octane levels is reduced, generally as much as about 10 percent to about 15 percent, based on the volume of the $C_5+$ liquids, and there is lower production of fuel gas, a product of relatively low value.

The process of this invention requires the use of the platinum-iridium catalyst, modified or promoted with the relatively small and infinitesimal amount of tin, within the reforming zone wherein the primary, or predominant reaction involves the dehydrocyclization of paraffins, and olefins. This zone, termed the "paraffin dehydrocyclization zone," is invariably found in the last reactor or zone of the series. Generally, the tail reactor of a series of reactors contains from about 55 percent to about 70 percent of the total catalyst charge, based on the total weight of catalyst in the reforming unit. Of course, where there is only a single reactor, quite obviously the paraffin dehydrocyclization reaction will predominate in the catalyst bed, or beds defining the zone located at the product exit side of the reactor. Where there are multiple reactors, quite obviously as has been suggested, the paraffin dehydrocyclization reaction will predominate in the catalyst bed, or beds defining a zone located at the product exit side of the last reactor of the series. Often the paraffin dehydrocyclization reaction is predominant of the sum-total of the reactions which occur within the catalyst bed, or beds constituting the last reactor of the series dependent upon the temperature and amount of catalyst that is employed in the final reactor vis-a-vis the total catalyst contained in the several reactors, and temperatures maintained in the other reactors of the reforming unit.

In one of its preferred aspects, promoted platinum, or platinum-rhenium catalyst is employed in the reforming zones in front of, or in advance of the paraffin dehydrocyclization zone, viz., the naphthene dehydrogenation zone, or zones, and the isomerization zone, or zones. Or, preferably also, an iridium promoted platinum, or platinum-iridium catalyst can be employed in the reforming zones in front of, or in advance of the paraffin dehydrocyclization zone, viz. the naphthene dehydrogenation zone, or zones, and the isomerization zone, or zones. Suitably, where a platinum-rhenium or platinum-iridium catalyst is employed, the weight ratio of the rhenium:platinum, or weight ratio of the iridium:-platinum, respectively, will range from about 0.1:1 to about 1:1, preferably from about 0.5:1 to about 1:1, with the absolute concentration of the platinum ranging from about 0.1 percent to about 1.0 percent, preferably from about 0.2 percent to about 0.7 percent, based on the total weight of the catalyst composition.

The catalyst employed in accordance with this invention is necessarily constituted of composite particles which contain, besides a support material, the hydrogenation-dehydrogenation components, a halide component and, preferably, the catalyst is sulfided. The support material is constituted of a porous, refractory inorganic oxide, particularly alumina. The support can contain, e.g., one or more alumina, bentonite, clay, diatomaceous earth, zeolite, silica, activated carbon, magnesia, zirconia, thoria, and the like; though the most preferred support is alumina to which, if desired, can be added a suitable amount of other refractory carrier materials such as silica, zirconia, magnesia, titania, etc., usually in a range of about 1 to 20 percent, based on the weight of the support. A preferred support for the practice of the present invention is one having a surface area of more than 50 m$^2$/g, preferably from about 100 to about 300 m$^2$/g, a bulk density of about 0.3 to 1.0 g/ml, preferably about 0.4 to 0.8 g/ml, an average pore volume of about 0.2 to 1.1 ml/g, preferably about 0.3 to 0.8 ml/g, and an average pore diameter of about 30 to 300 Angstrom units.

The metal hydrogenation-dehydrogenation components can be uniformly dispersed throughout the porous inorganic oxide support by various techniques known to the art such as ion-exchange, coprecipitation with the alumina in the sol or gel form, and the like. For example, the catalyst composite can be formed by adding together suitable reagents such as a salt of tin, and ammonium hydroxide or carbonate, and a salt of aluminum such as aluminum chloride or aluminum sulfate to form aluminum hydroxide. The aluminum hydroxide containing the tin salt can then be heated, dried, formed into pellets or extruded, and then calcined in air or nitrogen up to 1000° F. The other metal components can then be added. Suitably, the metal components can be added to the catalyst by impregnation, typically via an "incipient wetness" technique which requires a minimum of solution so that the total solution is absorbed, initially or after some evaporation.

It is preferred, in forming the catalysts of this invention, to deposit the tin first, and the additional metals are then added to a previously pilled, pelleted, beaded, extruded, or sieved tin containing particulate support material by the impregnation method. Pursuant to the impregnation method, porous refractory inorganic oxides in dry or solvated state are contacted, either alone or admixed, or otherwise incorporated with a metal or metals-containing solution, or solutions, and thereby impregnated by either the "incipient wetness" technique, or a technique emboding absorption from a dilute or concentrated solution, or solutions, with subsequent filtration or evaporation to effect total uptake of the metallic components which are uniformly dispersed throughout the particulate solids support.

In the step of forming the tin-containing support, a tin salt, e.g., stannous chloride, stannic chloride, stannic tartrate, stannic nitrate, or the like, can be uniformly dispersed throughout a solid support or carrier by the method described in U.S. Pat. No. 4,963,249 which was issued on Oct. 16, 1990 to William C. Baird, Jr. et al. specific reference being made to Column 6, lines 15 through 23, and Columns 58 through 69, inclusively, herewith incorporated and made of reference. In forming the lead reactor catalysts, the step of incorporating tin into the support is omitted, while other metallic components are added to the support by impregnation.

Platinum in absolute amount is usually supported on the carrier within the range of from about 0.1 to about 1.0 percent, preferably from about 0.2 to about 0.7 percent, based on the weight of the catalyst (dry basis). Iridium, in absolute amount, is also usually supported on the carrier within the range of from about 0.1 to about 1.0 percent, preferably from about 0.2 to about 0.7 percent, based on the weight of the catalyst (dry basis). Rhenium, in absolute amount, where a platinum-rhenium catalyst is formed for use in the lead reactors, is also usually supported on the carrier in concentration ranging from about 0.1 to about 1.0 percent, preferably from about 0.2 to about 0.7 percent, based on the weight of the catalyst (dry basis). The tin, where added to the support to form the catalyst of this invention, preferably before addition of the platinum and iridium, is added to the support in concentration ranging from about 0.02 percent to about 0.4 percent, preferably from about 0.05 to about 0.3 percent, based on the total weight of the catalyst (dry basis). The weight ratio of the (platinum-+iridium):tin suitably ranges from about 2:1 to about 25:1, preferably from about 5:1 to about 15:1, based on he total weight of the platinum, iridium, and tin in the catalyst composition.

To enhance catalyst performance in reforming operations, it is also required to add a halogen component to the catalysts, fluorine and chlorine being preferred halogen components. The halogen is contained on the catalyst within the range of 0.1 to 3 percent, preferably within the range of about 0.8 to about 1.5 percent, based on the weight of the catalyst. When using chlorine as the halogen component, it is added to the catalyst within the range of about 0.2 to 2 percent, preferably within the range of about 0.8 to 1.5 percent, based on the weight of the catalyst. The introduction of halogen into the catalyst can be carried out by any method at any time. It can be added to the catalyst during catalyst preparation, for example, prior to, following or simultaneously with the incorporation of a metal hydrogenation-dehydrogenation component, or components. It can also be introduced by contacting a carrier material in a vapor phase or liquid phase with a halogen compound such as hydrogen fluoride, hydrogen chloride, ammonium chloride, or the like.

The catalyst is dried by heating at a temperature above about 80° F., preferably between about 150° F. and 300° F., in the presence of nitrogen or oxygen, or both, in an air stream or under vacuum. The catalyst is calcined at a temperature between about 400° F. to 850° F., either in the presence of oxygen in an air stream or in the presence of an inert gas such as nitrogen.

Sulfur is a highly preferred component of the catalysts, the sulfur content of the catalyst generally ranging to about 0.2 percent, preferably from about 0.05 percent to about 0.15 percent, based on the weight of the catalyst (dry basis). The sulfur can be added to the catalyst by conventional methods, suitably by breakthrough sulfiding of a bed of the catalyst with a sulfur-containing gaseous stream, e.g., hydrogen sulfide in hydrogen, performed at temperatures ranging from about 350° F. to about 1050° F., and at pressures ranging from about 1 to about 40 atmospheres for the time necessary to achieve breakthrough, or the desired sulfur level.

The feed or charge stock can be a virgin naphtha, cracked naphtha, a naphtha from a coal liquefaction process, a Fischer-Tropsch naphtha, or the like. Typical feeds are those hydrocarbons containing from about 5 to about 12 carbon atoms, or more preferably from about 6 to about 9 carbon atoms. Naphthas, or petroleum fractions boiling within the range of from about 80° F. to about 450° F., and preferably from about 125° F. to about 375° F., contain hydrocarbons of carbon numbers within these ranges. Typical fractions thus usually contain from about 15 to about 80 vol. % paraffins, both normal and branched, which fall in the range of about $C_5$ to $C_{12}$, from about 10 to 80 vol. % of naphthenes falling within the range of from about $C_6$ to $C_{12}$, and from 5 through 20 vol. % of the desirable aromatics falling within the range of from about $C_6$ to $C_{12}$.

The reforming runs are initiated by adjusting the hydrogen and feed rates, and the temperature (Equivalent Isothermal Temperature) and pressure to operating conditions. The run is continued at optimum reforming conditions by adjustment of the major process variables, within the ranges described below:

| LEAD REACTOR CONDITIONS | | |
|---|---|---|
| Major Operating Variables | Typical Process Conditions | Preferred Process Conditions |
| Pressure, psig | 100–700 | 150–500 |
| Reactor Temp., °F. | 700–1000 | 800–950 |
| Recycle Gas Rate, SCF/B | 2000–10,000 | 2000–6000 |
| Feed Rate, W/Hr/W | 1–20 | 2–10 |

| TAIL REACTOR CONDITIONS | | |
|---|---|---|
| Major Operating Variables | Typical Process Conditions | Preferred Process Conditions |
| Pressure, psig | 100–700 | 150–500 |
| Reactor Temp., °F. | 800–1000 | 850–975 |
| Recycle Gas Rate, SCF/B | 2000–10,000 | 2000–6000 |
| Feed Rate, W/Hr/W | 1–10 | 2–8 |

The invention will be more fully understood by reference to the following comparative data illustrating its more salient features. All parts are given in terms of weight except as otherwise specified.

The following examples, and comparative demonstrations, are exemplary of the high activity, and selectivity of the catalysts of this invention; particularly, when employed in the paraffin dehydrocyclization zone of the series of reaction zones while a different platinum catalyst is employed in the lead reaction zones. In the examples and demonstrations which follow all parts are in terms of weight units, pressures in terms of pounds per square inch gauge, and temperatures are given in Fahrenheit degrees except as otherwise expressed.

In conducting these tests, an n-heptane feed was used in certain instances. In others a full range naphtha was employed.

Inspections on the full range Arab Light Naphtha feed employed in making certain of the tests are given below.

| Property | Arab Light Naphtha |
|---|---|
| Gravity at 60° | |
| API° | 59.4 |
| Specific | 0.7412 |
| Octane, RON Clear | 38 |
| Molecular Weight | 111.3 |
| Sulfur, wppm | 0.3 |
| Distillation D-86, °F. | |
| IBP | 193.5 |
| 5% | 216.5 |
| 10% | 221.0 |
| 50% | 257.0 |
| 90% | 309.0 |
| 95% | 320.5 |
| FBP | 340.0 |
| Composition, Wt. % | |
| Total Paraffins | 65.1 |
| Total Naphthenes | 19.3 |
| Total Aromatics | 15.6 |

EXAMPLE 1

In a first series of runs, the performance of the platinum-iridium-tin catalysts of this invention was compared with a platinum-iridium (0.6% Pt/0.6% Ir) catalyst, a highly active catalyst, in reforming a heptane feed at 100 psig and 350 psig, respectively. The platinum-iridium catalysts were prepared by coimpregnation of 1/16 inch diameter gamma alumina extrudates with an aqueous solution of chloroplatinic acid and chloroiridic acid to uniformly disperse the metals throughout the extrudates, and this step was followed by drying, and calcination at 500° F. The platinum and iridium metal components of the platinum-iridium-tin catalysts were prepared in similar manner after forming alumina extrudates throughout which tin had been uniformly dispersed in amounts of 0.05% Sn, 0.1% Sn and 0.3% Sn, respectively, during preparation of the alumina support material.

The catalysts, after their preparation in this manner, were charged to capacity in a single reactor and heated to 750° F. in air for three hours. Following three hours in air at 750° F., the catalyst was heated to 850° F., reduced with $H_2$, and all of the catalysts, except one as indicated, were then sulfided with $H_2S$ in hydrogen at 850° F. The heptane feed was then introduced to a reactor in conducting a series of runs, respectively, a base run with the platinum-iridium catalyst, and runs with each of the catalysts modified with different concentrations, respectively, of the tin. The conditions of operation, and results achieved with each of the catalysts are given in Table 1A (100 psig) and Table 1B (350 psig), respectively, as follows:

TABLE 1A

| HEPTANE REFORMING AT 100 PSIG 500° C., 20 W/H/W, $H_2$/Oil = 6 | | | | |
|---|---|---|---|---|
| 0.6% Pt/0.6% Ir with | nil Sn (BASE) | 0.05% Sn | 0.1% Sn | 0.3% Sn |
| Sulfided | Yes | Yes | Yes | Yes |
| Yield, Wt. % | | | | |

TABLE 1A-continued

HEPTANE REFORMING AT 100 PSIG
500° C., 20 W/H/W, $H_2$/Oil = 6

| | | | | |
|---|---|---|---|---|
| $C_1$ | 2.4 | 2.3 | 2.1 | 1.6 |
| i-$C_4$ | 2.9 | 2.9 | 2.6 | 3.2 |
| n-$C_4$ | 6.4 | 6.0 | 6.3 | 5.3 |
| $C_5+$ | 75.9 | 77.3 | 77.9 | 79.4 |
| Toluene | 30.8 | 31.0 | 31.9 | 31.3 |
| Conversion | 70.0 | 71.4 | 72.6 | 66.1 |
| Toluene Rate | 6.3 | 6.4 | 6.5 | 6.4 |
| Toluene Selectivity | 44.3 | 43.4 | 44.1 | 47.4 |

TABLE 1B

HEPTANE REFORMING AT 350 PSIG
480° C., 80 W/H/W, $H_2$/Oil = 3

| 0.6% Pt/0.6% Ir with | nil Sn (BASE) | 0.3% Sn | 0.3% Sn | 0.3% Sn |
|---|---|---|---|---|
| Sulfided | Yes | Yes | Yes | No |
| Yield, Wt. % | | | | |
| $C_1$ | 2.5 | 2.1 | 1.1 | 3.2 |
| i-$C_4$ | 0.5 | 0.4 | 0.8 | 0.4 |
| n-$C_4$ | 9.9 | 9.2 | 6.2 | 5.8 |
| $C_5+$ | 70.0 | 73.5 | 82.6 | 79.3 |
| Toluene | 10.5 | 10.0 | 6.3 | 6.3 |
| Conversion | 52.0 | 46.4 | 33.8 | 38.3 |
| Toluene Rate | 8.4 | 8.0 | 5.1 | 6.5 |
| Toluene Selectivity | 20.4 | 21.7 | 18.7 | 17.2 |

These data, obtained by light product analyses over a four hour period, show that tin suppresses methane and ethane yields, and the $C_5+$ liquid yield is considerably improved. Activity, as determined by conversion and toluene rate, compares well with the base case at 100 psig. At 350 psig however, 0.3% tin diminishes the activity. The use of an unsulfided catalyst, used in an attempt to compensate for the diminished activity, produces excessive methane formation. A catalyst having an attempt to compensate for the diminished activity, produces excessive methane formation. A catalyst having 0.1% tin was found to increase the $C_5+$ liquid yield with only a modest activity debit.

EXAMPLE 2

In a second series of runs, a full range naphtha was reformed in recycle pilot plant runs over a catalyst charged to capacity in a single reactor, i.e., a tin modified platinum-iridium catalyst (0.6% Pt/0.6% Ir/0.1% Sn), and its performance compared in similar runs with known platinum-iridium catalysts which did not contain any tin, viz., Catalyst A (0.6% Pt/0.6% Ir) and Catalyst B (0.3% Pt/0.3% Ir). In conducting these runs, ten to twenty material balances were made over a period of several weeks and the results recorded and averaged. The results, and the conditions of operation, are given in Table 2.

TABLE 2

NAPHTHA REFORMING WITH Pt—Ir CATALYSTS
880° F.-940° F., 375 PSIG, 3500 SCF/B RECYCLE GAS,
4 W/H/W. $H_2$/OIL = 2.5, RON = 100

| Catalyst | A (0.6% Pt/ 0.6% Ir) | This invention (0.6% Pt/0.6% Ir/0.1% Sn) | B (0.3% Pt/ 0.3% Ir) |
|---|---|---|---|
| Relative Activity Number | 310 | 260 | 220 |
| $C_5+$ @ 100 RON, LV % | 68.6 | 70.8 | 68.2 |
| Wt. % @ 100 RON | | | |

TABLE 2-continued

NAPHTHA REFORMING WITH Pt—Ir CATALYSTS
880° F.-940° F., 375 PSIG, 3500 SCF/B RECYCLE GAS,
4 W/H/W. $H_2$/OIL = 2.5, RON = 100

| $H_2$ | 1.2 | 1.3 | 1.3 |
|---|---|---|---|
| $C_1$ | 6.2 | 5.4 | 5.9 |
| $C_2$ | 6.0 | 5.4 | 6.0 |
| $C_3$ | 5.4 | 5.1 | 5.6 |
| $C_4$ | 6.3 | 6.2 | 6.8 |
| $C_5+$ | 74.8 | 76.5 | 74.2 |

These data clearly show that the tin modified platinum-iridium catalyst of this invention produces a 2.2 Vol. % $C_5+$ liquid yield improvement over a reforming operation conducted with Catalyst A, and a 2.6 Vol. % $C_5+$ liquid yield improvement over one conducted with Catalyst B. The activity of the catalyst of this invention is only slightly less than that of Catalyst A.

The following example, Example 3, simulates a staged reactor system wherein platinum-iridium catalysts are employed in the lead reactors of the series, and a tin-modified platinum-iridium catalyst is employed in the tail reactor of the series.

EXAMPLE 3

In a pair of additional runs, a full range naphtha was reformed in a simulated series of reactors at similar conditions except that in this instance, the front 45% of the reactor volume in each of the pair of runs was charged with a platinum-iridium (0.3% Pt/0.3% Ir) catalyst, i.e., Catalyst B as identified in Example 2, and the catalyst charged to the exit side of the reactor (rearward 55% of the reactor volume) was (1) a non-tin modified platinum-iridium (0.6% Pt/0.6% Ir) catalyst, Catalyst A as identified in Example 2, and (2) a tin modified platinum-iridium (0.6% Pt/0.6% Ir/0.1% Sn) catalyst, a catalyst of this invention, as identified in Example 2. The results, and the conditions of operation, are given in Table 3.

TABLE 3

NAPHTHA REFORMING WITH STAGED Pt—Ir CATALYSTS
880° F.-940° F., 375 PSIG, 3500 SCF/B RECYCLE GAS,
4 W/H/W, $H_2$/OIL = 2.5, RON = 100
Catalyst Loading

| Forward 45% | B (0.3% Pt/0.3% Ir) | B (0.3% Pt/0.3% Ir) |
|---|---|---|
| Rearward 55% | A (0.6% Pt/0.6% Ir) | Catalyst of this Invention (0.6% Pt/0.6% Ir/0.1% Sn) |
| Relative Activity Number | 290 | 250 |
| $C_5+$ @ 100 RON, LV % | 68.0 | 70.0 |
| Wt. % @ 100 RON | | |
| $H_2$ | 1.2 | 1.4 |
| $C_1$ | 6.3 | 5.1 |
| $C_2$ | 6.5 | 5.5 |
| $C_3$ | 6.0 | 5.8 |
| $C_4$ | 6.3 | 6.3 |
| $C_5+$ | 74.5 | 76.1 |

These data clearly demonstrate that the catalyst of this invention, employed in the dehydrocyclization zone of the reactor, provides lower gas make and a 2.0 Vol. % $C_5+$ liquid yield boost with only a modest activity loss.

The following example and comparative demonstrations, like those described by reference to Example 1, demonstrate the selectivity advantages that can be obtained by the use of tin to modify the characteristics of a platinum-iridium catalyst; differing from Example 1 in that the catalyst contains lesser amounts of the platinum and iridium metal components.

EXAMPLE 4

Example 1, and comparative demonstrations, were repeated, heptane being passed over, at 100 psig and 350 psig, respectively, a platinum-iridium (0.3% Pt/0.3% Ir) catalyst—the base catalyst—, platinum-iridium catalysts modified with varying amounts of tin, viz., 0.05% Sn, 0.1% Sn and 0.3% Sn, respectively, and a platinum-rhenium catalyst charged to capacity in a single reactor. The conditions of operation, and the results obtained are given in Tables 4A and 4B, respectively.

TAB:E 4A

| HEPTANE REFORMING AT 100 PSIG 500° C. , 20 W/H/W, $H_2$/OIL = 6 | | | | | |
|---|---|---|---|---|---|
| 0.3% Pt/ 0.3% Ir with | nil Sn (BASE) | 0.05% Sn | 0.1% Sn | 0.3% Sn | 0.3% Pt/ 0.7% Re |
| Sulfided Yield, Wt. % | Yes | Yes | Yes | Yes | Yes |
| C1 | 1.8 | 1.8 | 1.5 | 1.4 | 0.9 |
| i-C$_4$ | 2.8 | 3.0 | 2.4 | 2.9 | 3.0 |
| n-C$_4$ | 5.0 | 4.9 | 4.4 | 4.1 | 4.1 |
| C$_5$+ | 80.4 | 80.6 | 83.2 | 82.7 | 83.4 |
| Toluene | 29.0 | 27.2 | 25.9 | 27.8 | 20.5 |
| Conversion | 62.3 | 62.7 | 57.7 | 58 | 50.7 |
| Toluene Rate | 5.9 | 5.6 | 5.3 | 5.7 | 4.2 |
| Toluene Selectivity | 46.3 | 43.3 | 44.9 | 47.9 | 40.4 | tion, permitting higher C$_5$+liquid yields than a non-tin modified platinum-iridium catalyst. On the other hand, whereas some activity is lost by the platinum-iridium catalyst as a result of the added tin, the activity loss is very modest. Tin suppresses methane and ethane yields when added in small, and infinitesimal amount to platinum-iridium catalysts, as shown by these data, but yet the activity of the tin modified platinum-iridium catalysts is still superior to conventional platinum-rhenium catalysts. Tin added to the platinum-iridium catalyst has a pronounced C$_5$+liquid yield benefit at higher pressure.

Staged platinum-rhenium catalysts are currently widely employed as high pressure reforming catalysts in commercial reforming units. The reactors in these units are filled to capacity with the catalyst, and the octane barrel production is constrained by the activity of the platinum-rhenium catalysts. Increasing octane demand provides strong incentives for catalysts with higher activity than the commercial platinum-rhenium catalysts at equivalent C$_5$+liquid yield. The catalyst of this invention, as demonstrated by the following example, can provide higher activity with C$_5$+liquid yield equivalent to the platinum-rhenium catalysts. Replacing, e.g., a presently used 0.3% Pt/0.7% Re catalyst with a tin modified platinum-iridium (0.3% Pt/0.3% Ir) catalyst can give a significant activity boost without yield debit, as shown by the following data.

EXAMPLE 5

A full range naphtha feed was reformed in parallel runs, at similar conditions, in a reactor the forward 45% of the available reactor space of which contained a platinum-rhenium (0.3% Pt/0.3% Re) catalyst, Catalyst

TABLE 4B

| HEPTANE REFORMING AT 350 PSIG 480° C., 80 W/H/W, $H_2$/OIL = 3 | | | | | |
|---|---|---|---|---|---|
| 0.3% Pt/0.3% Ir with | nil Sn (BASE) | 0.05% Sn | 0.1% Sn | 0.3% Sn | 0.3% Sn | Pt/Re 0.3%/0.7% |
| Sulfided Yield, Wt. % | Yes | Yes | Yes | Yes | No | Yes |
| C1 | 1.3 | 1.1 | 0.8 | 0.6 | 3.5 | 0.3 |
| i-C$_4$ | 1.0 | 1.1 | 0.7 | 0.8 | 0.5 | 0.5 |
| n-C$_4$ | 7.9 | 6.9 | 5.5 | 4.3 | 6.3 | 2.0 |
| C$_5$+ | 79.1 | 81.8 | 85.7 | 88.6 | 77.7 | 94.6 |
| Toluene | 10.1 | 8.7 | 7.1 | 6.7 | 5.7 | 4.2 |
| Conversion | 46.3 | 41.5 | 31.8 | 26.4 | 42.5 | 13.3 |
| Toluene Rate | 8.1 | 7.0 | 5.7 | 5.4 | 4.3 | 3.3 |
| Toluene Selectivity | 21.8 | 21.0 | 22.4 | 25.5 | 13.5 | 31.1. |

These data clearly show that the iridium modifier added to platinum provides a higher conversion and toluene rate than rhenium. Normally however this increased activity is accompanied by lower C$_5$+liquid yields caused by excessive metals dealkylation. The use of tin as a modifier suppresses iridium metal dealkyla- C, and the rearward 55% of the available reactor space of which, in a first run was packed with (1) a platinum-rhenium (0.3% Pt/0.7% Re) catalyst, Catalyst D. and, in a second run, (2) with a tin modified platinum-iridium (0.3% Pt/0.3% Ir/0.1% Sn) catalyst, a catalyst of this invention.

TABLE 5

| NAPHTHA REFORMING WITH STAGED Pt—Re/Pt—Ir CATALYSTS 880° F.-980° F., 375 PSIG, 2 W/H/W, 3.5 kSCF/B RECYCLE, $H_2$/OIL = 2.5, RON = 100 | | |
|---|---|---|
| | Catalyst | |
| Forward 45% | C (0.3% Pt/0.3% Re) | C (0.3% Pt/0.3% Re) |
| Rearward 55% | D (0.3% Pt/0.7% Re) | 0.3% Pt/0.3% Ir/0.1% Sn |
| Relative Activity | 60 | 120 |
| C$_5$+ @ 100 RON, LV % | 69 | 70 |
| Wt. % @ 100 RON | | |
| H$_2$ | 1.4 | 1.4 |
| C$_1$ | 2.7 | 3.7 |
| C$_2$ | 5.5 | 5.3 |

TABLE 5-continued

NAPHTHA REFORMING WITH STAGED Pt—Re/Pt—Ir CATALYSTS
880° F.–980° F., 375 PSIG, 2 W/H/W, 3.5 kSCF/B RECYCLE,
H₂/OIL = 2.5, RON = 100

|  | Catalyst |  |
|---|---|---|
| C₃ | 7.5 | 6.3 |
| C₄ | 8.3 | 7.6 |
| C₅+ | 74.5 | 75.6 |

These data thus show a profound increase in activity using the tin modified platinum-iridium catalyst of this invention in the hydrodecyclization zone, or exit side of the reactor. Thus, the activity of the tin modified platinum-iridium catalyst used only in the rearward side of the reactor space doubled the activity of the total catalyst used in the system, and reduced gas make as well as having increased the C₅+liquid yield by 1.0 Vol. %. In addition, this catalyst has been found to temper temperature runaway rates during process upsets as contrasted with conventional platinum-iridium catalysts.

It is apparent that various modifications and changes can be made without departing the spirit and scope of the invention.

Having described the invention, what is claimed is:

1. A process for improving the octane quality of a naphtha which comprises reforming said naphtha at reforming conditions wherein said reforming conditions are defined as follows:

| pressure, psig | about 100 to 700 |
|---|---|
| reactor temperature, °F. | about 700 to 1000 | over a catalyst which includes from about 0.1 percent to about 1.0 percent platinum, from about 0.1 percent to about 1.0 percent iridium, and from about 0.02 percent to about 0.4 percent tin, wherein each of said metals is composited with and uniformly dispersed throughout an inorganic oxide support.

2. The process of claim 1 wherein the catalyst contains from about 0.2 percent to about 0.7 percent platinum, from about 0.2 percent to about 0.7 percent iridium, and from about 0.05 to about 0.3 percent tin.

3. The process of claim 1 wherein the catalyst contains a weight ratio of (platinum+iridium): tin ranging from about 2:1 to about 25:1.

4. The process of claim 1 wherein the catalyst contains from about 0.1 percent to about 3.0 percent halogen.

5. The process of claim 1 wherein the catalyst contains from about 0.01 percent to about 0.2 percent sulfur.

6. The process of claim 1 wherein the inorganic oxide support component of the catalyst is alumina.

7. In a process of improving the octane quality of a naphtha in a reforming unit comprised of a plurality of serially connected reactors inclusive of one or more lead reactors and a tail reactor, each of which contains a platinum catalyst, the naphtha flowing in sequence from one reactor of the series to another and contacting the catalyst at reforming conditions wherein said reforming conditions are defined as follows:

| pressure, psig | about 100 to 700 |
|---|---|
| reactor temperature | about 700 to 1000 | in the presence of hydrogen, the improvement comprising, providing the tail reactor with a catalyst comprised of from about 0.1 percent to about 0.1 percent platinum, from about 0.1 percent to about 1.0 percent iridium, and from about 0.02 percent to about 0.4 percent tin, based on the total weight of the catalyst, wherein each of said metals is composited with and uniformly dispersed throughout an inorganic oxide support.

8. The process of claim 7 wherein the catalyst in the tail reactor contains from about 0.2 to about 0.7 percent platinum, from about 0.2 to about 0.7 percent iridium, and from about 0.05 to about 0.3 percent tin.

9. The process of claim 7 wherein the catalyst contains a weight ratio of (platinum+iridium): tin ranging from about 2:1 to about 25:1.

10. The process of claim 7 wherein the catalyst in the lead reactors contains from about 0.1 percent to about 1.0 percent platinum, and from about 0.1 percent to about 1.0 percent iridium.

11. The process of claim 7 wherein the catalyst in the lead reactors contains from about 0.1 percent to about 1.0 percent platinum, and from about 0.1 percent to about 1.0 percent rhenium.

12. The process of claim 7 wherein the catalyst contains from about 0.1 percent to about 3.0 percent halogen.

13. The process of claim 12 wherein the catalyst contains from about 0.8 percent to about 1.5 percent halogen.

14. The process of claim 7 wherein the catalyst is sulfided, and contains from about 0.01 to about 0.2 percent sulfur.

15. The process of claim 14 wherein the catalyst contains from about 0.05 percent to about 0.15 percent sulfur.

16. The process of claim 7 wherein the reforming conditions employed in the tail reactor of the series are defined as follows:

| Pressure, psig | about 100 to 700 |
|---|---|
| Reactor Temperature, °F. | about 800 to 1050 |
| Gas Rate, SCF/B | about 2000 to 10,000 |
| Feed Rate, W/Hr/W | about 1 to 10. |

17. The process of claim 7 wherein the reforming conditions employed in the tail reactor of the series are defined as follows:

| Pressure, psig | about 150 to 500 |
|---|---|
| Reactor Temperature, °F. | about 850 to 975 |
| Gas Rate, SCF/B | about 2000 to 6000 |
| Feed Rate, W/Hr/W | about 2 to 8. |

18. The process of claim 7 wherein the reforming conditions employed in the lead reactors of the series are defined as follows:

| | |
|---|---|
| Pressure, psig | about 100 to 700 |
| Reactor Temperature, °F. | about 700 to 1000 |
| Gas Rate, SCF/B | about 2000 to 10,000 |
| Feed Rate, W/Hr/W | about 1 to 20. |

19. The process of claim 7 wherein the reforming conditions employed in the lead reactors of the series are defined as follows:

| | |
|---|---|
| Pressure, psig | about 150 to 500 |
| Reactor Temperature, °F. | about 800 to 950 |
| Gas Rate, SCF/B | about 2000 to 6000 |
| Feed Rate, W/Hr/W | about 2 to 10. |

20. The process of claim 7 wherein the inorganic oxide support component of the catalyst is alumina.

* * * * *